(12) United States Patent
Miyazaki

(10) Patent No.: US 9,291,878 B2
(45) Date of Patent: Mar. 22, 2016

(54) SINGLE FOCAL LENGTH LENS SYSTEM, INTERCHANGEABLE LENS APPARATUS AND CAMERA SYSTEM

(71) Applicant: Panasonic Intellectual Property Management Co., Ltd., Osaka (JP)

(72) Inventor: Kyoichi Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/576,932

(22) Filed: Dec. 19, 2014

(65) Prior Publication Data

US 2015/0192839 A1    Jul. 9, 2015

(30) Foreign Application Priority Data

Jan. 6, 2014    (JP) .................................. 2014-000401

(51) Int. Cl.
| | |
|---|---|
| *G02B 13/04* | (2006.01) |
| *G03B 17/14* | (2006.01) |
| *G02B 9/64* | (2006.01) |
| *H04N 5/225* | (2006.01) |
| *G02B 27/42* | (2006.01) |

(52) U.S. Cl.
CPC ............ *G03B 17/14* (2013.01); *G02B 9/64* (2013.01); *H04N 5/2254* (2013.01); *G02B 27/4205* (2013.01)

(58) Field of Classification Search
CPC ....................................................... G02B 13/04
USPC .................................. 359/749–753, 672–675
See application file for complete search history.

(56) References Cited

U.S. PATENT DOCUMENTS

| | | | | |
|---|---|---|---|---|
| 4,116,536 A | * | 9/1978 | Moscovich | G02B 13/04 359/749 |
| 2002/0048093 A1 | * | 4/2002 | Suzuki | G02B 13/04 359/752 |
| 2005/0219715 A1 | * | 10/2005 | Kimura | G02B 13/06 359/749 |
| 2006/0066951 A1 | * | 3/2006 | Sensui | G02B 27/646 359/672 |
| 2013/0033768 A1 | | 2/2013 | Sunaga et al. | |

FOREIGN PATENT DOCUMENTS

| | | |
|---|---|---|
| JP | 2012-242472 | 12/2012 |
| JP | 2013-037080 | 2/2013 |

* cited by examiner

*Primary Examiner* — Scott J Sugarman
(74) *Attorney, Agent, or Firm* — Wenderoth, Lind & Ponack, L.L.P.

(57) ABSTRACT

A single focal length lens system comprising at least a positive first lens unit and a second lens unit, wherein the first lens unit includes a first sub lens unit E which successively comprises a negative lens element A, a positive lens element B, a negative lens element C and a positive lens element D, a second sub lens unit comprising at least one lens element is a focusing lens unit in the second lens unit, and the conditions: $1.0<|f_W/f_A|<2.2$, $0.5<f_W/f_B<2.0$, $0.5<|f_W/f_C|<1.7$, and $0.5<f_W/f_D<1.8$ ($f_W$: focal length of the lens system, $f_A$: focal length of the lens element A, $f_B$: focal length of the lens element B, $f_C$: focal length of the lens element C, $f_D$: focal length of the lens element D) are satisfied.

8 Claims, 6 Drawing Sheets

SINGLE FOCAL LENGTH LENS SYSTEM, INTERCHANGEABLE LENS APPARATUS AND CAMERA SYSTEM

CROSS-REFERENCE TO RELATED APPLICATION

This application is based on application No. 2014-000401 filed in Japan on Jan. 6, 2014, the contents of which are hereby incorporated by reference.

BACKGROUND

1. Field

The present disclosure relates to single focal length lens systems, interchangeable lens apparatuses, and camera systems.

2. Description of the Related Art

In recent years, interchangeable-lens type digital camera systems (also referred to simply as "camera systems", hereinafter) have been spreading rapidly. Such camera systems realize: taking of high-sensitive and high-quality images; high-speed focusing and high-speed image processing after image taking; easy replacement of an interchangeable lens apparatus in accordance with a desired scene; and the like.

As lens systems to be used in interchangeable lens apparatuses, compact lens systems having high optical performance have been desired. For example, various kinds of lens systems having a three-unit configuration have been proposed.

Japanese Laid-Open Patent Publications Nos. 2012-242472 and 2013-037080 each disclose a lens system having a three-unit configuration of positive, negative, and positive, in which an aperture diaphragm is placed in a first lens unit, and a second lens unit performs focusing.

SUMMARY

The present disclosure provides a compact single focal length lens system which sufficiently compensates various aberrations, has high optical performance even in a peripheral part thereof, and is capable of high-speed focusing. Further, the present disclosure provides a compact and high-performance interchangeable lens apparatus and a compact and high-performance camera system, each including the single focal length lens system.

The novel concepts disclosed herein were achieved in order to solve the foregoing problems in the related art, and herein is disclosed:

a single focal length lens system, in order from an object side to an image side, comprising: at least
a first lens unit having positive optical power; and
a second lens unit having optical power, wherein
the first lens unit includes a first sub lens unit E which, successively in order from the object side to the image side, comprises:
a lens element A having negative optical power;
a lens element B having positive optical power;
a lens element C having negative optical power; and
a lens element D having positive optical power, wherein
in the second lens unit, a second sub lens unit comprising at least one lens element is a focusing lens unit that moves with respect to an image surface along an optical axis in focusing from an infinity in-focus condition to a close-object in-focus condition, and wherein
the following conditions (1) to (4) are satisfied:

$$1.0 < |f_W/f_A| < 2.2 \quad (1)$$

$$0.5 < f_W/f_B < 2.0 \quad (2)$$

$$0.5 < |f_W/f_C| < 1.7 \quad (3)$$

$$0.5 < f_W/f_D < 1.8 \quad (4)$$

where
$f_W$ is a focal length of the single focal length lens system in the infinity in-focus condition,
$f_A$ is a focal length of the lens element A,
$f_B$ is a focal length of the lens element B,
$f_C$ is a focal length of the lens element C, and
$f_D$ is a focal length of the lens element D.

The novel concepts disclosed herein were achieved in order to solve the foregoing problems in the related art, and herein is disclosed:

an interchangeable lens apparatus comprising:
a single focal length lens system; and
a lens mount section which is connectable to a camera body including an image sensor for receiving an optical image formed by the single focal length lens system and converting the optical image into an electric image signal, wherein
the single focal length lens system, in order from an object side to an image side, comprises: at least
a first lens unit having positive optical power; and
a second lens unit having optical power, wherein
the first lens unit includes a first sub lens unit E which, successively in order from the object side to the image side, comprises:
a lens element A having negative optical power;
a lens element B having positive optical power;
a lens element C having negative optical power; and
a lens element D having positive optical power, wherein
in the second lens unit, a second sub lens unit comprising at least one lens element is a focusing lens unit that moves with respect to an image surface along an optical axis in focusing from an infinity in-focus condition to a close-object in-focus condition, and wherein
the following conditions (1) to (4) are satisfied:

$$1.0 < |f_W/f_A| < 2.2 \quad (1)$$

$$0.5 < f_W/f_B < 2.0 \quad (2)$$

$$0.5 < |f_W/f_C| < 1.7 \quad (3)$$

$$0.5 < f_W/f_D < 1.8 \quad (4)$$

where
$f_W$ is a focal length of the single focal length lens system in the infinity in-focus condition,
$f_A$ is a focal length of the lens element A,
$f_B$ is a focal length of the lens element B,
$f_C$ is a focal length of the lens element C, and
$f_D$ is a focal length of the lens element D.

The novel concepts disclosed herein were achieved in order to solve the foregoing problems in the related art, and herein is disclosed:

a camera system comprising:
an interchangeable lens apparatus including a single focal length lens system; and
a camera body which is detachably connected to the interchangeable lens apparatus via a camera mount section, and includes an image sensor for receiving an optical image formed by the single focal length lens system and converting the optical image into an electric image signal, wherein the single focal length lens system, in order from an object side to an image side, comprises: at least
  a first lens unit having positive optical power; and
  a second lens unit having optical power, wherein
  the first lens unit includes a first sub lens unit E which, successively in order from the object side to the image side, comprises:
    a lens element A having negative optical power;
    a lens element B having positive optical power;
    a lens element C having negative optical power; and
    a lens element D having positive optical power, wherein
  in the second lens unit, a second sub lens unit comprising at least one lens element is a focusing lens unit that moves with respect to an image surface along an optical axis in focusing from an infinity in-focus condition to a close-object in-focus condition, and wherein
  the following conditions (1) to (4) are satisfied:

$$1.0<|f_W/f_A|<2.2 \quad (1)$$

$$0.5<f_W/f_B<2.0 \quad (2)$$

$$0.5<|f_W/f_C|<1.7 \quad (3)$$

$$0.5<f_W/f_D<1.8 \quad (4)$$

where
$f_W$ is a focal length of the single focal length lens system in the infinity in-focus condition,
$f_A$ is a focal length of the lens element A,
$f_B$ is a focal length of the lens element B,
$f_C$ is a focal length of the lens element C, and
$f_D$ is a focal length of the lens element D.

The single focal length lens system according to the present disclosure is compact, sufficiently compensates various aberrations, has high optical performance even in a peripheral part thereof, and is capable of high-speed focusing.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicant provides the attached drawings and the following description so that those skilled in the art can fully understand this disclosure. Therefore, the drawings and description are not intended to limit the subject defined by the claims.

In the present disclosure, a lens unit is a unit composed of at least one lens element. The power, the composite focal length, and the like of each lens unit are determined in accordance with the type, the number, the arrangement, and the like of lens elements included in the lens unit.

Embodiments 1 to 5

FIGS. 1, 3, 5, 7, and 9 are lens arrangement diagrams of single focal length lens systems according to Embodiments 1 to 5, respectively, and each diagram shows a single focal length lens system in an infinity in-focus condition.

In each Fig., an arrow imparted to each lens unit indicates focusing from an infinity in-focus condition to a close-object in-focus condition. That is, the arrow indicates a direction in which a second lens unit G2 described later moves in focusing from the infinity in-focus condition to the close-object in-focus condition.

In each Fig., an asterisk "*" imparted to a particular surface indicates that the surface is aspheric. In each Fig., symbol (+) or (−) imparted to the symbol of each lens unit corresponds to the sign of the optical power of the lens unit. In each Fig., a straight line located on the most right-hand side indicates the position of an image surface S.

Each of the single focal length lens systems according to Embodiments 1 to 5, in order from the object side to the image side, includes: a first lens unit G1 having positive optical power, a second lens unit G2 having negative optical power, and a third lens unit G3 having positive optical power. An aperture diaphragm A is provided in the first lens unit G1.

Embodiment 1

Figure 1:
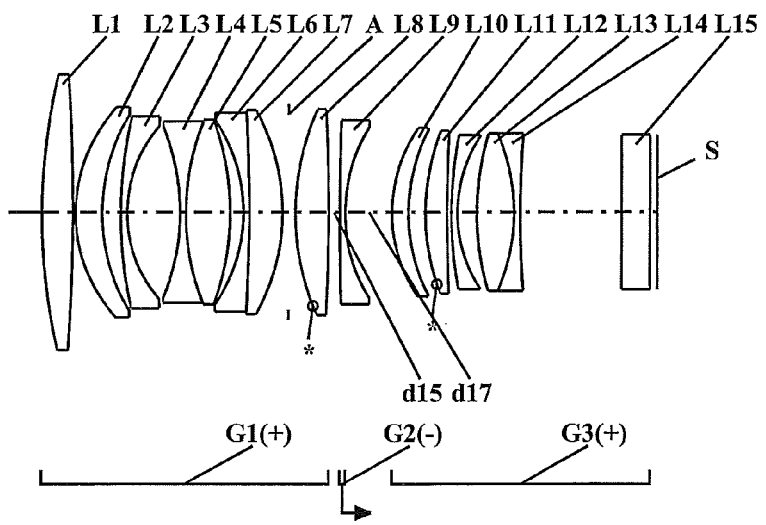
FIG. 1 is a lens arrangement diagram showing an infinity in-focus condition of a single focal length lens system according to Embodiment 1 (Numerical Example 1)
Figure 2:
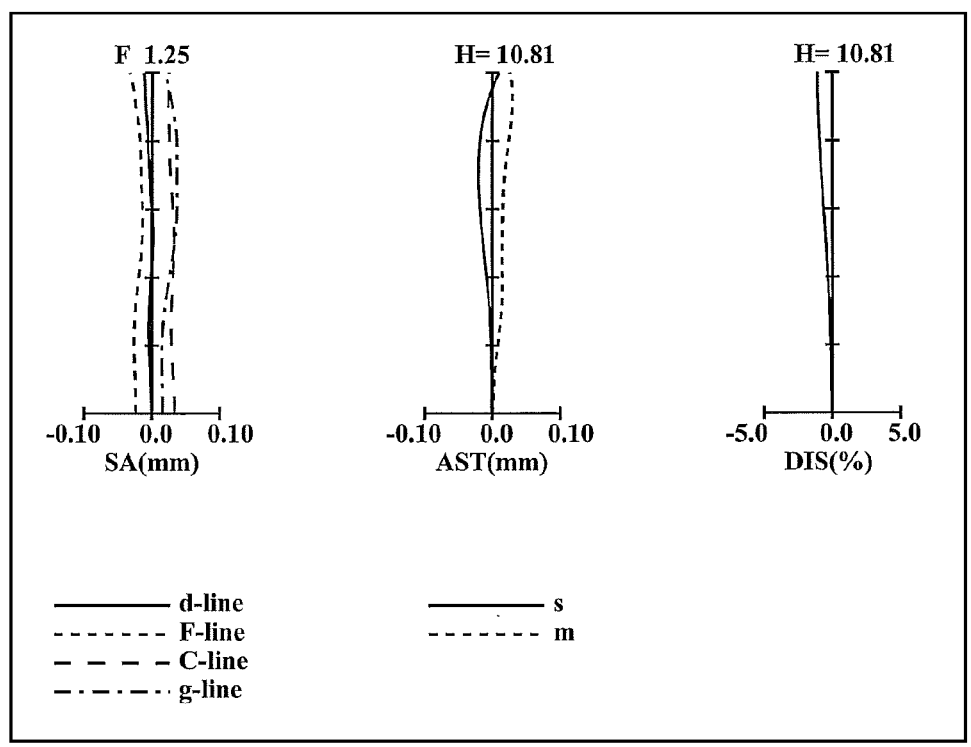
FIG. 2 is a longitudinal aberration diagram of the infinity in-focus condition of the single focal length lens system according to Numerical Example 1.

As shown in FIG. 1, the first lens unit G1, in order from the object side to the image side, comprises: a bi-convex first lens element L1; a positive meniscus second lens element L2 with the convex surface facing the object side; a negative meniscus third lens element L3 with the convex surface facing the object side; a bi-concave fourth lens element L4; a bi-convex fifth lens element L5; a negative meniscus sixth lens element L6 with the convex surface facing the image side; a positive meniscus seventh lens element L7 with the convex surface facing the image side; an aperture diaphragm A; and a bi-convex eighth lens element L8. Among these, the fourth lens element L4 and the fifth lens element L5 are cemented with each other, and the sixth lens element L6 and the seventh lens element L7 are cemented with each other. The eighth lens element L8 has an aspheric object side surface.

The second lens unit G2 comprises solely a negative meniscus ninth lens element L9 with the convex surface facing the object side.

The third lens unit G3, in order from the object side to the image side, comprises: a positive meniscus tenth lens element L10 with the convex surface facing the object side; a positive meniscus eleventh lens element L11 with the convex surface facing the object side; a negative meniscus twelfth lens element L12 with the convex surface facing the object side; a bi-convex thirteenth lens element L13; a bi-concave fourteenth lens element L14; and a plane parallel plate L15. Among these, the thirteenth lens element L13 and the fourteenth lens element L14 are cemented with each other. The eleventh lens element L11 has an aspheric object side surface.

In focusing from the infinity in-focus condition to the close-object in-focus condition, the first lens unit G1 and the third lens unit G3 are fixed with respect to the image surface S, and the second lens unit G2 as a focusing lens unit moves to the image side along the optical axis.

The eleventh lens element L11 corresponds to an image blur compensating lens unit that moves in a direction perpendicular to the optical axis to optically compensate image blur.

Embodiment 2

Figure 3:
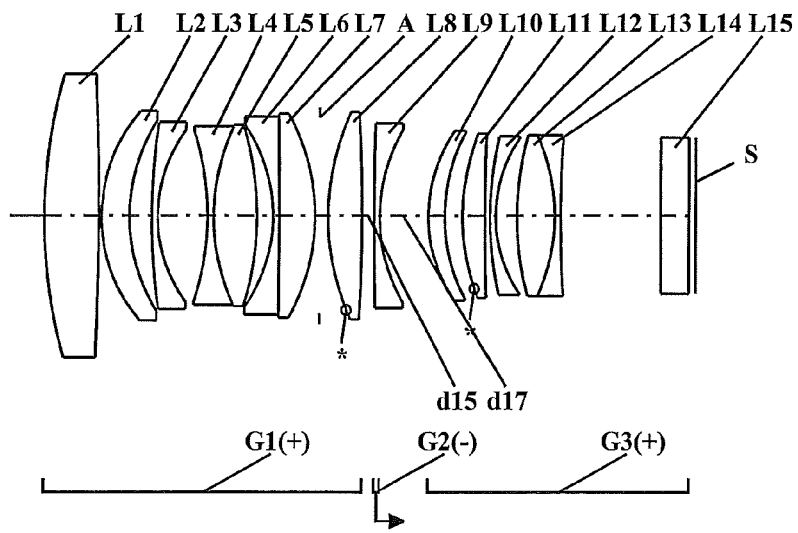
FIG. 3 is a lens arrangement diagram showing an infinity in-focus condition of a single focal length lens system according to Embodiment 2 (Numerical Example 2)
Figure 4:
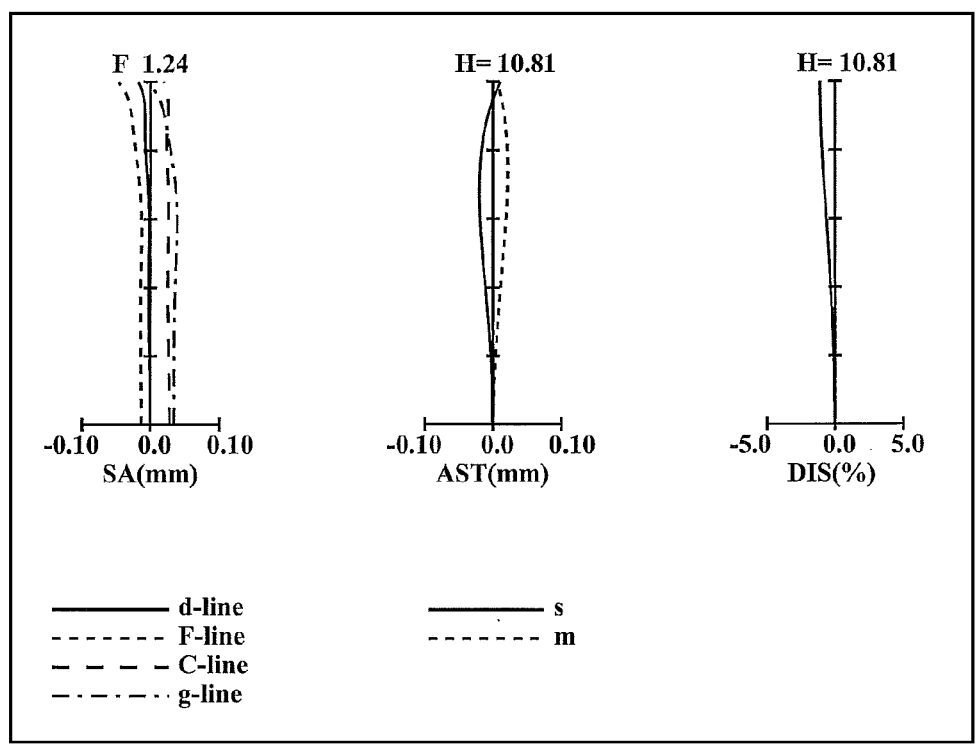
FIG. 4 is a longitudinal aberration diagram of the infinity in-focus condition of the single focal length lens system according to Numerical Example 2.

As shown in FIG. 3, the first lens unit G1, in order from the object side to the image side, comprises: a bi-convex first lens element L1; a positive meniscus second lens element L2 with the convex surface facing the object side; a negative meniscus third lens element L3 with the convex surface facing the object side; a bi-concave fourth lens element L4; a bi-convex fifth lens element L5; a negative meniscus sixth lens element L6 with the convex surface facing the image side; a positive meniscus seventh lens element L7 with the convex surface facing the image side; an aperture diaphragm A; and a bi-convex eighth lens element L8. Among these, the fourth lens element L4 and the fifth lens element L5 are cemented with each other, and the sixth lens element L6 and the seventh lens element L7 are cemented with each other. The eighth lens element L8 has an aspheric object side surface.

The second lens unit G2 comprises solely a negative meniscus ninth lens element L9 with the convex surface facing the object side.

The third lens unit G3, in order from the object side to the image side, comprises: a positive meniscus tenth lens element L10 with the convex surface facing the object side; a positive meniscus eleventh lens element L11 with the convex surface facing the object side; a negative meniscus twelfth lens element L12 with the convex surface facing the object side; a bi-convex thirteenth lens element L13; a bi-concave fourteenth lens element L14; and a plane parallel plate L15. Among these, the thirteenth lens element L13 and the fourteenth lens element L14 are cemented with each other. The eleventh lens element L11 has an aspheric object side surface.

In focusing from the infinity in-focus condition to the close-object in-focus condition, the first lens unit G1 and the third lens unit G3 are fixed with respect to the image surface S, and the second lens unit G2 as a focusing lens unit moves to the image side along the optical axis.

The eleventh lens element L11 corresponds to an image blur compensating lens unit that moves in a direction perpendicular to the optical axis to optically compensate image blur.

Embodiment 3

Figure 5:
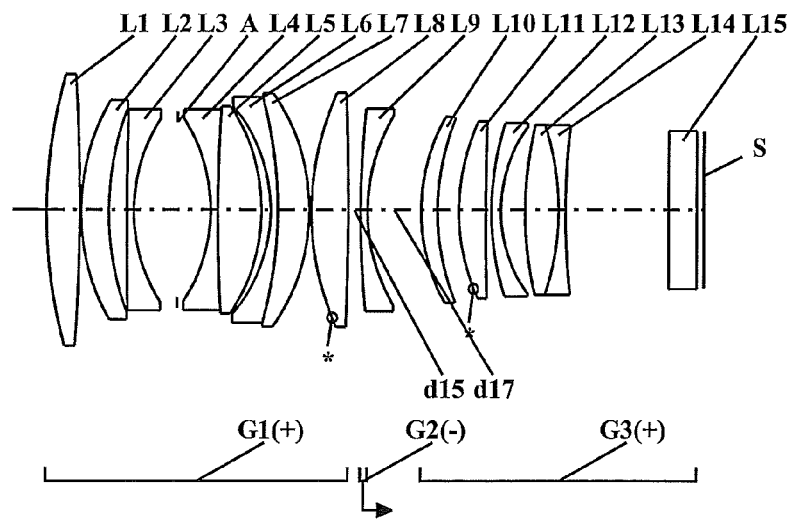
FIG. 5 is a lens arrangement diagram showing an infinity in-focus condition of a single focal length lens system according to Embodiment 3 (Numerical Example 3)
Figure 6:
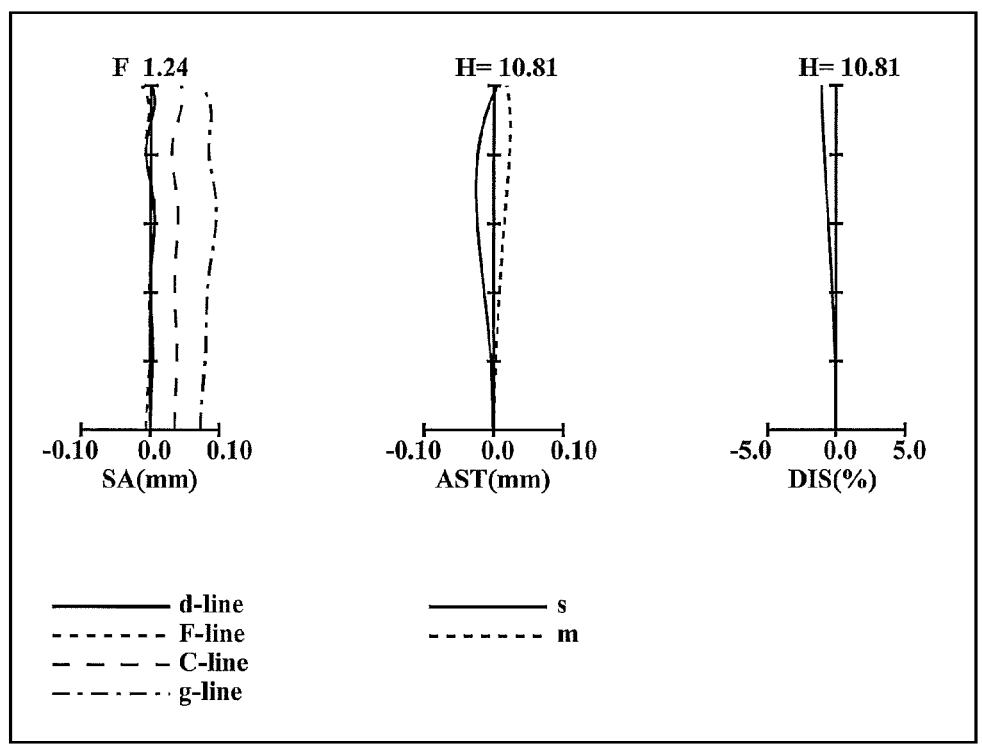
FIG. 6 is a longitudinal aberration diagram of the infinity in-focus condition of the single focal length lens system according to Numerical Example 3.

As shown in FIG. 5, the first lens unit G1, in order from the object side to the image side, comprises: a bi-convex first lens element L1; a positive meniscus second lens element L2 with the convex surface facing the object side; a negative meniscus third lens element L3 with the convex surface facing the object side; an aperture diaphragm A; a bi-concave fourth lens element L4; a bi-convex fifth lens element L5; a negative meniscus sixth lens element L6 with the convex surface facing the image side; a positive meniscus seventh lens element L7 with the convex surface facing the image side; and a bi-convex eighth lens element L8. Among these, the fourth lens element L4 and the fifth lens element L5 are cemented with each other, and the sixth lens element L6 and the seventh lens element L7 are cemented with each other. The eighth lens element L8 has an aspheric object side surface.

The second lens unit G2 comprises solely a negative meniscus ninth lens element L9 with the convex surface facing the object side.

The third lens unit G3, in order from the object side to the image side, comprises: a positive meniscus tenth lens element L10 with the convex surface facing the object side; a positive meniscus eleventh lens element L11 with the convex surface facing the object side; a negative meniscus twelfth lens element L12 with the convex surface facing the object side; a bi-convex thirteenth lens element L13; a bi-concave fourteenth lens element L14; and a plane parallel plate L15. Among these, the thirteenth lens element L13 and the fourteenth lens element L14 are cemented with each other. The eleventh lens element L11 has an aspheric object side surface.

In focusing from the infinity in-focus condition to the close-object in-focus condition, the first lens unit G1 and the third lens unit G3 are fixed with respect to the image surface S, and the second lens unit G2 as a focusing lens unit moves to the image side along the optical axis.

The eleventh lens element L11 corresponds to an image blur compensating lens unit that moves in a direction perpendicular to the optical axis to optically compensate image blur.

Embodiment 4

Figure 7:
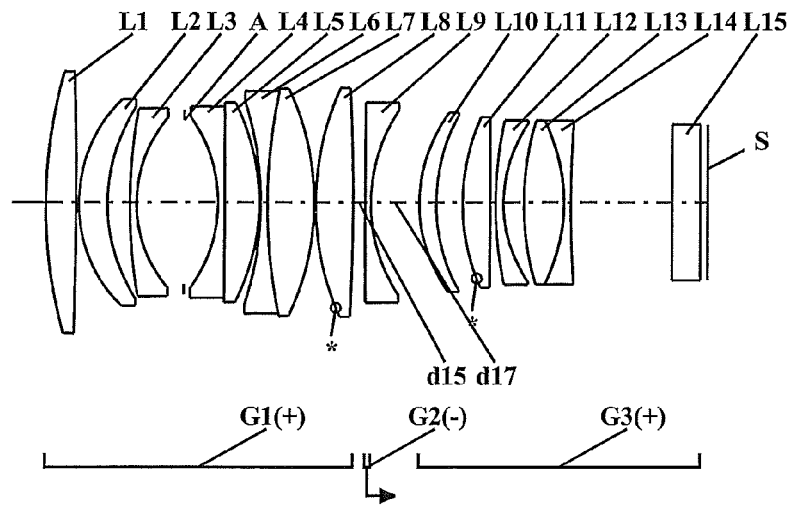
FIG. 7 is a lens arrangement diagram showing an infinity in-focus condition of a single focal length lens system according to Embodiment 4 (Numerical Example 4)
Figure 8:
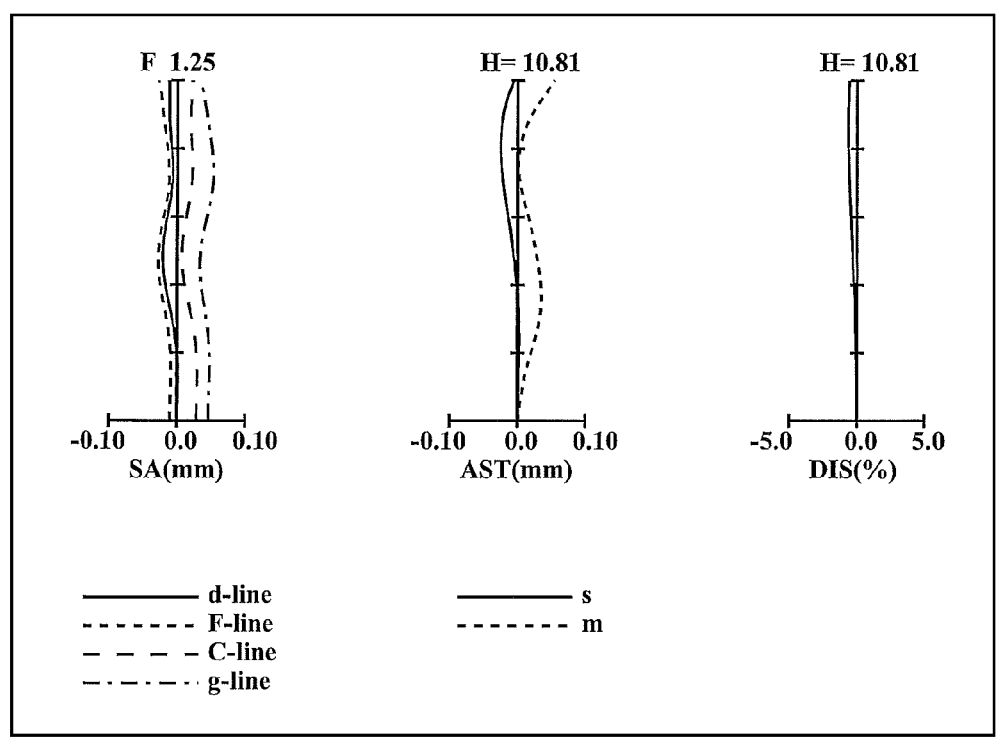
FIG. 8 is a longitudinal aberration diagram of the infinity in-focus condition of the single focal length lens system according to Numerical Example 4.

As shown in FIG. 7, the first lens unit G1, in order from the object side to the image side, comprises: a bi-convex first lens element L1; a positive meniscus second lens element L2 with the convex surface facing the object side; a negative meniscus third lens element L3 with the convex surface facing the object side; an aperture diaphragm A; a negative meniscus fourth lens element L4 with the convex surface facing the image side; a positive meniscus fifth lens element L5 with the convex surface facing the image side; a bi-concave sixth lens element L6; a bi-convex seventh lens element L7; and a bi-convex eighth lens element L8. Among these, the fourth lens element L4 and the fifth lens element L5 are cemented with each other, and the sixth lens element L6 and the seventh lens element L7 are cemented with each other. The eighth lens element L8 has an aspheric object side surface.

The second lens unit G2 comprises solely a negative meniscus ninth lens element L9 with the convex surface facing the object side.

The third lens unit G3, in order from the object side to the image side, comprises: a positive meniscus tenth lens element L10 with the convex surface facing the object side; a bi-convex eleventh lens element L11; a negative meniscus twelfth lens element L12 with the convex surface facing the object side; a bi-convex thirteenth lens element L13; a bi-concave fourteenth lens element L14; and a plane parallel plate L15. Among these, the thirteenth lens element L13 and the fourteenth lens element L14 are cemented with each other. The eleventh lens element L11 has an aspheric object side surface.

In focusing from the infinity in-focus condition to the close-object in-focus condition, the first lens unit G1 and the third lens unit G3 are fixed with respect to the image surface S, and the second lens unit G2 as a focusing lens unit moves to the image side along the optical axis.

The eleventh lens element L11 corresponds to an image blur compensating lens unit that moves in a direction perpendicular to the optical axis to optically compensate image blur.

Embodiment 5

Figure 9:
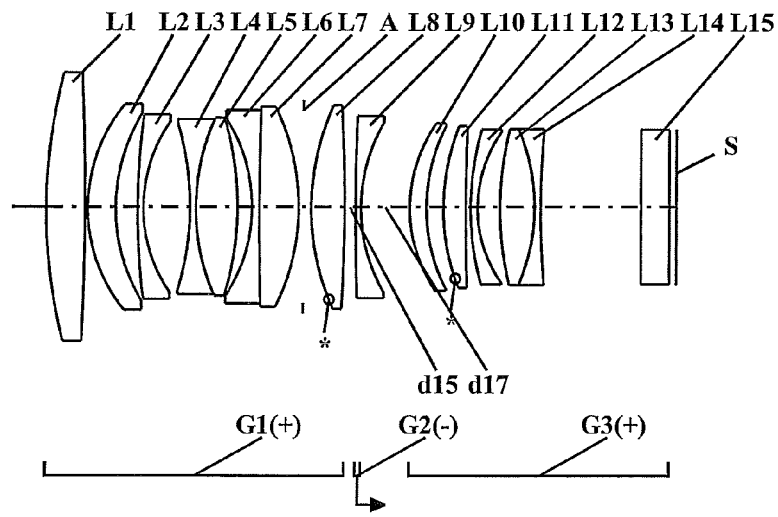
FIG. 9 is a lens arrangement diagram showing an infinity in-focus condition of a single focal length lens system according to Embodiment 5 (Numerical Example 5)
Figure 10:
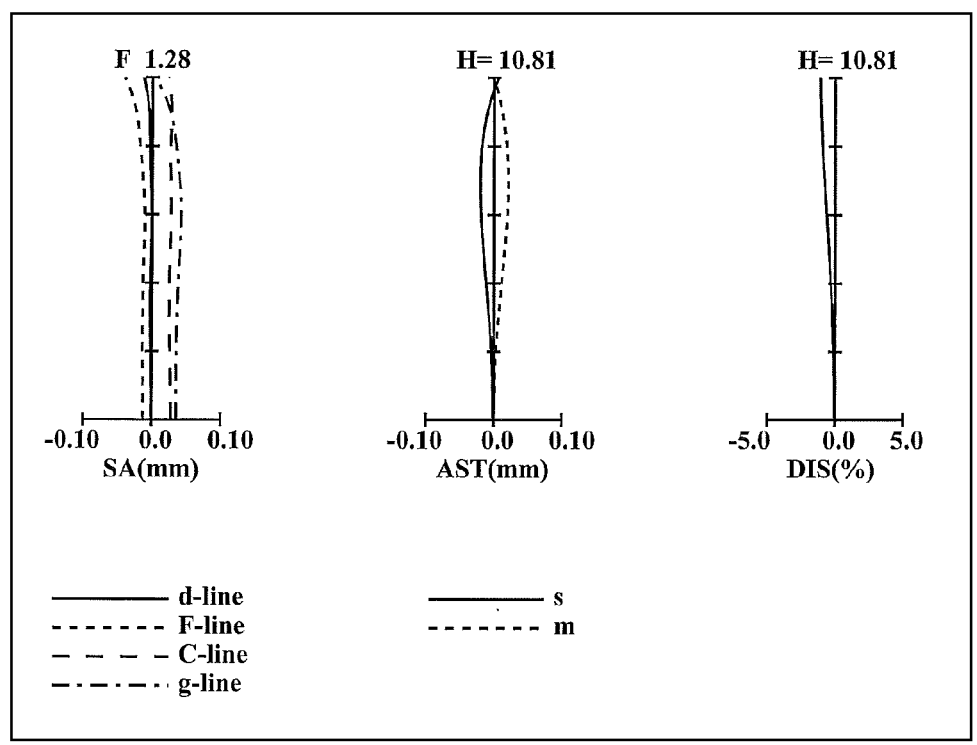
FIG. 10 is a longitudinal aberration diagram of the infinity in-focus condition of the single focal length lens system according to Numerical Example 5.

As shown in FIG. 9, the first lens unit G1, in order from the object side to the image side, comprises: a bi-convex first lens element L1; a positive meniscus second lens element L2 with the convex surface facing the object side; a negative meniscus third lens element L3 with the convex surface facing the object side; a bi-concave fourth lens element L4; a bi-convex fifth lens element L5; a bi-concave sixth lens element L6; a bi-convex seventh lens element L7; an aperture diaphragm A; and a bi-convex eighth lens element L8. Among these, the fourth lens element L4 and the fifth lens element L5 are cemented with each other, and the sixth lens element L6 and the seventh lens element L7 are cemented with each other. The eighth lens element L8 has an aspheric object side surface.

The second lens unit G2 comprises solely a negative meniscus ninth lens element L9 with the convex surface facing the object side.

The third lens unit G3, in order from the object side to the image side, comprises: a positive meniscus tenth lens element L10 with the convex surface facing the object side; a positive meniscus eleventh lens element L11 with the convex surface facing the object side; a negative meniscus twelfth lens element L12 with the convex surface facing the object side; a bi-convex thirteenth lens element L13; a bi-concave fourteenth lens element L14; and a plane parallel plate L15. Among these, the thirteenth lens element L13 and the fourteenth lens element L14 are cemented with each other. The eleventh lens element L11 has an aspheric object side surface.

In focusing from the infinity in-focus condition to the close-object in-focus condition, the first lens unit G1 and the third lens unit G3 are fixed with respect to the image surface S, and the second lens unit G2 as a focusing lens unit moves to the image side along the optical axis.

The eleventh lens element L11 corresponds to an image blur compensating lens unit that moves in a direction perpendicular to the optical axis to optically compensate image blur.

In the single focal length lens systems according to Embodiments 1 to 5, the first lens unit G1 having positive optical power includes a first sub lens unit E which comprises, successively in order from the object side to the image side, a lens element A having negative optical power, a lens element B having positive optical power, a lens element C having negative optical power, and a lens element D having positive optical power. Therefore, it is possible to realize a single focal length lens system in which various aberrations are sufficiently compensated, and high clearness and high performance are achieved even in a peripheral part thereof.

In the single focal length lens system according to Embodiments 1 to 5, the lens element A and the lens element B are cemented with each other at one optical surface thereof, thereby to form a cemented lens element. Therefore, reduction in imaging performance due to a decentering error between the lens element A and the lens element B hardly occurs.

In the single focal length lens systems according to Embodiments 1 to 5, the lens element C and the lens element D are cemented with each other at one optical surface thereof, thereby to form a cemented lens element. Therefore, reduction in imaging performance due to a decentering error between the lens element C and the lens element D hardly occurs.

In the single focal length lens systems according to Embodiments 1 to 5, the first lens unit G1 includes a lens element F having positive optical power and a lens element G having negative optical power, on the object side relative to the first sub lens unit E. Thereby, the overall length of the lens system can be reduced.

In the single focal length lens systems according to Embodiments 1 to 5, in the second lens unit G2, the focusing lens unit which is the second sub lens unit composed of at least one lens element comprises a single lens element H having negative optical power. Thereby, fluctuation in aberrations according to the focusing distance is small. In addition, since the focusing lens unit is lightweight, high-speed focusing is easily performed.

The single focal length lens systems according to Embodiments 1 to 5 each include the aperture diaphragm A, and at least one lens element having negative optical power and placed on the image side relative to the aperture diaphragm A. Thereby, chromatic aberration in the peripheral part can be favorably compensated.

It is beneficial to include the image blur compensating lens unit, like the single focal length lens systems according to Embodiments 1 to 5. The image blur compensating lens unit can compensate image point movement caused by vibration of the entire system.

When compensating image point movement caused by vibration of the entire system, the image blur compensating lens unit moves in the direction perpendicular to the optical axis, whereby image blur can be compensated in a state that increase in the size of the entire lens system is suppressed to realize a compact configuration and that excellent imaging characteristics such as small decentering coma aberration and small decentering astigmatism are maintained.

As described above, Embodiments 1 to 5 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for beneficial conditions that a single focal length lens system like the single focal length lens systems according to Embodiments 1 to 5 can satisfy. Here, a plurality of beneficial conditions is set forth for the single focal length lens system according to each embodiment. A configuration that satisfies all the plurality of conditions is most effective for the single focal length lens system. However, when an individual condition is satisfied, a single focal length lens system having the corresponding effect is obtained.

For example, in a single focal length lens system like the single focal length lens systems according to Embodiments 1 to 5 which comprises, in order from the object side to the image side, at least the first lens unit having positive optical power and the second lens unit having optical power, in which the first lens unit includes the first sub lens unit E comprising, successively in order from the object side to the image side, the lens element A having negative optical power, the lens element B having positive optical power, the lens element C having negative optical power, and the lens element D having positive optical power, and the second sub lens unit that is included in the second lens unit and is composed of at least one lens element is a focusing lens unit that moves with respect to the image surface along the optical axis in focusing from the infinity in-focus condition to the close-object in-focus condition (this lens configuration is referred to as a basic configuration of the embodiments, hereinafter), the following conditions (1) to (4) are satisfied:

$$1.0 < |f_W/f_A| < 2.2 \tag{1}$$

$$0.5 < f_W/f_B < 2.0 \tag{2}$$

$$0.5 < |f_W/f_C| < 1.7 \tag{3}$$

$$0.5 < f_W/f_D < 1.8 \tag{4}$$

where $f_W$ is a focal length of the single focal length lens system in the infinity in-focus condition, $f_A$ is a focal length of the lens element A, $f_B$ is a focal length of the lens element B, $f_C$ is a focal length of the lens element C, and $f_D$ is a focal length of the lens element D.

The conditions (1) to (4) set forth the focal lengths of the lens elements A to D, respectively. When the values go below the lower limits of the conditions (1) to (4), the interval for moving the focusing lens unit cannot be secured. As a result, compensation of coma aberration in the peripheral part is insufficient. When the values exceed the upper limits of the conditions (1) to (4), it is difficult to compensate chromatic aberrations that occur in the lens elements A to D.

When at least one of the following conditions (1)' and (1)" is satisfied, the above-mentioned effect is achieved more successfully.

$$1.2 < |f_W/f_A| \tag{1)'}$$

$$|f_W/f_A| < 2.0 \tag{1)"}$$

When at least one of the following conditions (2)' and (2)" is satisfied, the above-mentioned effect is achieved more successfully.

$$0.7 < f_W/f_B \tag{2)'}$$

$$f_W/f_B < 1.8 \tag{2)"}$$

When at least one of the following conditions (3)' and (3)" is satisfied, the above-mentioned effect is achieved more successfully.

$$0.7 < |f_W/f_C| \tag{3)'}$$

$$|f_W/f_C| < 1.5 \tag{3)"}$$

When at least one of the following conditions (4)' and (4)" is satisfied, the above-mentioned effect is achieved more successfully.

$$0.7 < f_W/f_D \tag{4)'}$$

$$f_W/f_D < 1.6 \tag{4)"}$$

For example, in a single focal length lens system having the basic configuration like the single focal length lens systems according to Embodiments 1 to 5, in which the first lens unit includes the lens element F having positive optical power and the lens element G having negative optical power on the object side relative to the first sub lens unit E, it is beneficial to satisfy the following condition (5):

$$0.7 < (R1_G + R2_G)/(R1_G - R2_G) < 2.2 \tag{5}$$

where $R1_G$ is a radius of curvature of an object side surface of the lens element G, and $R2_G$ is a radius of curvature of an image side surface of the lens element G.

The condition (5) sets forth a shape factor of the lens element G. When the value goes below the lower limit of the condition (5), aberration of a light beam passing near the effective diameter of the lens element G is increased, and thereby coma aberration is likely to occur, which might cause degradation of imaging performance. When the value exceeds the upper limit of the condition (5), difficulty in manufacturing the lens element G is increased, which might cause increase in component costs.

When at least one of the following conditions (5)' and (5)" is satisfied, the above-mentioned effect is achieved more successfully:

$$1.0 < (R1_G + R2_G)/(R1_G - R2_G) \tag{5)'}$$

$$(R1_G + R2_G)/(R1_G - R2_G) < 1.9 \tag{5)"}$$

For example, in a single focal length lens system having the basic configuration like the single focal length lens systems according to Embodiments 1 to 5, in which the focusing lens unit is composed of the single lens element H having negative optical power, it is beneficial to satisfy the following condition (6):

$$0.8 < |f_W/f_H| < 1.2 \tag{6}$$

where $f_W$ is the focal length of the single focal length lens system in the infinity in-focus condition, and $f_H$ is a focal length of the lens element H.

The condition (6) sets forth the focal length of the lens element H. When the value goes below the lower limit of the condition (6), the amount of movement of the focusing lens unit is increased, which might cause increase in the overall length of the entire lens system. When the value exceeds the upper limit of the condition (6), great aberration is caused by the focusing lens unit, which might cause increase in change of aberration according to the focusing distance.

When at least one of the following conditions (6)' and (6)" is satisfied, the above-mentioned effect is achieved more successfully:

$$0.9 < |f_W/f_H| \tag{6)'}$$

$$|f_W/f_H| < 1.1 \tag{6)"}$$

For example, in a single focal length lens system having the basic configuration, and including the aperture diaphragm and the lens elements that are placed on the image side relative to the aperture diaphragm and that have negative optical power, like the single focal length lens systems according to Embodiments 1 to 5, it is beneficial that a lens element I which is at least one of the lens elements satisfies the following condition (7):

$$0.638 < 0.0018 \times vd_I + PgF_I < 0.652 \tag{7}$$

where $vd_I$ is an Abbe number to a d-line of the lens element I, and $PgF_I$ is a partial dispersion ratio of the lens element I, which is the ratio of a difference between a refractive index to a g-line and a refractive index to a F-line, to a difference between the refractive index to the F-line and a refractive index to a C-line.

The condition (7) sets forth the partial dispersion ratio of the lens element I. When the value goes below the lower limit of the condition (7), compensation of chromatic aberration by the lens element I is excessive. As a result, the chromatic aberration might not be favorably compensated. When the value exceeds the upper limit of the condition (7), compensation of the chromatic aberration by the lens element I is insufficient. As a result, compensation of the chromatic aberration in the entire lens system might be insufficient.

When at least one of the following conditions (7)' and (7)" is satisfied, the above-mentioned effect is achieved more successfully:

$$0.643 < 0.0018 \times vd_I + PgF_I \quad (7)'$$

$$0.0018 \times vd_I + PgF_I < 0.648 \quad (7)''$$

The individual lens units constituting the single focal length lens systems according to Embodiments 1 to 5 are each composed exclusively of refractive type lens elements that deflect incident light by refraction (that is, lens elements of a type in which deflection is achieved at the interface between media having different refractive indices). However, the present disclosure is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved. Thus, such a configuration is beneficial.

Embodiment 6

Figure 11:
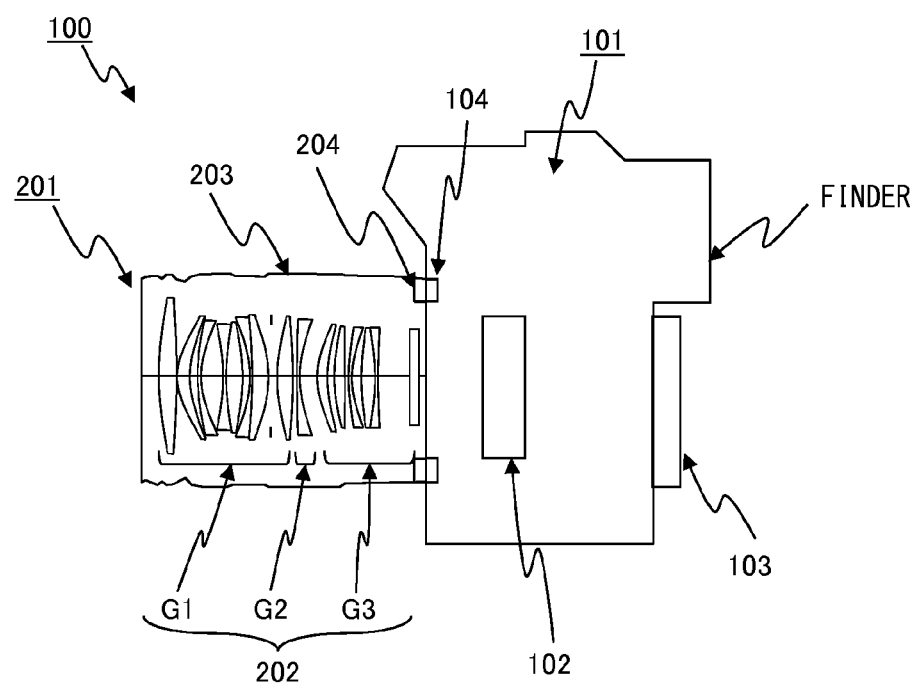
FIG. 11 is a schematic construction diagram of an interchangeable-lens type digital camera system according to Embodiment 6.

FIG. 11 is a schematic construction diagram of an interchangeable-lens type digital camera system according to Embodiment 6.

The interchangeable-lens type digital camera system 100 according to Embodiment 6 includes a camera body 101, and an interchangeable lens apparatus 201 which is detachably connected to the camera body 101.

The camera body 101 includes: an image sensor 102 which receives an optical image formed by a single focal length lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a single focal length lens system 202 according to any of Embodiments 1 to 5; a lens barrel 203 which holds the single focal length lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 11, the single focal length lens system according to Embodiment 1 is employed as the single focal length lens system 202.

In Embodiment 6, since the single focal length lens system 202 according to any of Embodiments 1 to 5 is employed, a compact interchangeable lens apparatus having excellent imaging performance can be realized at low cost. Moreover, size reduction and cost reduction of the entire camera system 100 according to Embodiment 6 can be achieved.

As described above, Embodiment 6 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the single focal length lens systems according to Embodiments 1 to 5 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line.

In the numerical examples, nC is the refractive index to the C-line, nF is the refractive index to the F-line, and ng is the refractive index to the g-line. PgF is the partial dispersion ratio, which is the ratio of a difference between the refractive index to the g-line and the refractive index to the F-line, to a difference between the refractive index to the F-line and the refractive index to the C-line. The PgF is calculated in accordance with the following expression.

$$PgF = (ng - nF)/(nF - nC)$$

In the numerical examples, the surfaces marked with * are aspherical surfaces, and the aspherical surface configuration is defined by the following expression.

$$Z = \frac{h^2/r}{1 + \sqrt{1-(1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is a n-th order aspherical coefficient.

FIGS. 2, 4, 6, 8, and 10 are longitudinal aberration diagrams of the infinity in-focus condition of the single focal length lens systems according to Numerical Examples 1 to 5, respectively.

Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line, the long dash line and the one-dot dash line indicate the characteristics to the d-line, the F-line, the C-line and the g-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

Numerical Example 1

The single focal length lens system of Numerical Example 1 corresponds to Embodiment 1 shown in FIG. 1. Table 1 shows the surface data-1 of the single focal length lens system of Numerical Example 1. Table 2 shows the surface data-2. Table 3 shows the aspherical data. Table 4 shows the various data. Table 5 shows the single lens data. Table 6 shows the lens unit data. Table 7 shows the magnification of lens unit.

TABLE 1

(Surface data-1)

| Surface number | r | d | nd | vd |
|---|---|---|---|---|
| Object surface | ∞ | Variable | | |
| 1 | 88.94930 | 4.58050 | 2.00069 | 25.5 |
| 2 | −293.91700 | 0.40000 | | |
| 3 | 22.68640 | 3.92870 | 1.91082 | 35.2 |
| 4 | 27.22530 | 2.86230 | | |
| 5 | 66.14630 | 0.90000 | 1.71736 | 29.5 |
| 6 | 19.53600 | 7.77990 | | |
| 7 | −32.89550 | 0.85000 | 1.74077 | 27.8 |
| 8 | 36.44520 | 6.43410 | 1.72916 | 54.7 |
| 9 | −38.90630 | 1.90760 | | |
| 10 | −24.22570 | 0.85000 | 1.73800 | 32.3 |
| 11 | −251.20070 | 4.84910 | 1.91082 | 35.2 |
| 12 | −31.32990 | 0.90000 | | |
| 13 (Diaphragm) | ∞ | 1.00000 | | |
| 14* | 36.01210 | 4.92270 | 1.77250 | 49.5 |
| 15 | −275.66870 | Variable | | |
| 16 | 426.03380 | 0.80000 | 1.64769 | 33.8 |
| 17 | 24.44100 | Variable | | |
| 18 | 21.71480 | 2.45220 | 1.49700 | 81.6 |
| 19 | 26.40490 | 2.51260 | | |
| 20* | 32.71250 | 3.18080 | 1.77250 | 49.5 |
| 21 | 265.86480 | 0.63830 | | |
| 22 | 59.22490 | 0.90000 | 1.58144 | 40.9 |
| 23 | 20.26200 | 2.88110 | | |
| 24 | 41.21880 | 5.48590 | 1.91082 | 35.2 |
| 25 | −28.46500 | 0.90000 | 1.72047 | 34.7 |
| 26 | 152.64250 | 14.89890 | | |
| 27 | ∞ | 4.20000 | 1.51680 | 64.2 |
| 28 | ∞ | 1.00000 | | |
| 29 | ∞ | (BF) | | |
| Image surface | ∞ | | | |

TABLE 2

(Surface data-2)

| Surface number | nC | nF | ng | PgF |
|---|---|---|---|---|
| Object surface | | | | |
| 1 | 1.98941 | 2.02872 | 2.05283 | 0.61349 |
| 2 | | | | |
| 3 | 1.90323 | 1.92907 | 1.94412 | 0.58210 |
| 4 | | | | |
| 5 | 1.71032 | 1.73464 | 1.74931 | 0.60338 |
| 6 | | | | |
| 7 | 1.73307 | 1.75976 | 1.77597 | 0.60762 |
| 8 | 1.72510 | 1.73844 | 1.74571 | 0.54521 |
| 9 | | | | |
| 10 | 1.73131 | 1.75418 | 1.76768 | 0.58981 |
| 11 | 1.90323 | 1.92907 | 1.94412 | 0.58210 |
| 12 | | | | |
| 13 (Diaphragm) | | | | |
| 14* | 1.76781 | 1.78343 | 1.79208 | 0.55383 |
| 15 | | | | |

TABLE 2-continued (Surface data-2)

| Surface number | nC | nF | ng | PgF |
|---|---|---|---|---|
| 16 | 1.64210 | 1.66124 | 1.67258 | 0.59229 |
| 17 | | | | |
| 18 | 1.49514 | 1.50123 | 1.50451 | 0.53875 |
| 19 | | | | |
| 20* | 1.76781 | 1.78343 | 1.79208 | 0.55383 |
| 21 | | | | |
| 22 | 1.57723 | 1.59145 | 1.59965 | 0.57667 |
| 23 | | | | |
| 24 | 1.90323 | 1.92907 | 1.94412 | 0.58210 |
| 25 | 1.71437 | 1.73512 | 1.74723 | 0.58336 |
| 26 | | | | |
| 27 | 1.51432 | 1.52237 | 1.52667 | 0.53418 |
| 28 | | | | |
| 29 | | | | |
| Image surface | | | | |

TABLE 3

(Aspherical data)

Surface No. 14

K = 0.00000E+00, A4 = −8.82474E−07, A6 = −2.66575E−08, A8 = 6.28551E−10 A10 = −8.63242E−12, A12 = 7.02096E−14, A14 = −3.41463E−16, A16 = 9.61591E−19 A18 = −1.41336E−21, A20 = 8.03991E−25

Surface No. 20

K = 0.00000E+00, A4 = −2.65682E−06, A6 = 7.87795E−08, A8 = −3.97424E−09 A10 = 1.04942E−10, A12 = −1.57641E−12, A14 = 1.36945E−14, A16 = −6.66305E−17 A18 = 1.60419E−19, A20 = −1.29884E−22

TABLE 4

(Various data)

| Object distance | Infinity | 3000 | 500 |
|---|---|---|---|
| Focal length | 41.6492 | 41.8063 | 42.1991 |
| F-number | 1.24560 | 1.26075 | 1.35227 |
| Half view angle | 14.7086 | 14.4923 | 13.2820 |
| Image height | 10.8150 | 10.8150 | 10.8150 |
| Overall length of lens system | 90.6000 | 90.6001 | 90.6000 |
| BF | 0.00021 | 0.00016 | 0.00013 |
| d0 | ∞ | 2909.4000 | 409.3999 |
| d15 | 1.6999 | 2.3739 | 6.5910 |
| d17 | 6.8852 | 6.2113 | 1.9942 |
| Entrance pupil position | 40.6049 | 40.6049 | 40.6049 |
| Exit pupil position | −63.5721 | −62.8654 | −57.6787 |
| Front principal points position | 54.9677 | 54.3424 | 49.4594 |
| Back principal points position | 48.9508 | 48.1956 | 44.1270 |

TABLE 5

(Single lens data)

| Lens element | Initial surface number | Focal length |
|---|---|---|
| 1 | 1 | 68.6476 |
| 2 | 3 | 105.7644 |
| 3 | 5 | −38.9618 |
| 4 | 7 | −23.2191 |

TABLE 5-continued (Single lens data)

| Lens element | Initial surface number | Focal length |
|---|---|---|
| 5 | 8 | 26.7714 |
| 6 | 10 | −36.3877 |
| 7 | 11 | 38.8899 |
| 8 | 14 | 41.5170 |
| 9 | 16 | −40.0636 |
| 10 | 18 | 209.5996 |
| 11 | 20 | 48.0021 |
| 12 | 22 | −53.4238 |
| 13 | 24 | 19.2066 |
| 14 | 25 | −33.2302 |

TABLE 6

(Lens unit data)

| Lens unit | Initial surface No. | Focal length | Overall length of lens unit | Front principal points position | Back principal points position |
|---|---|---|---|---|---|
| 1 | 1 | 43.10776 | 42.16490 | 33.81980 | 32.46247 |
| 2 | 16 | −40.06361 | 0.80000 | 0.51548 | 0.82957 |
| 3 | 18 | 34.93666 | 38.04980 | 5.64129 | 11.58964 |

TABLE 7

(Magnification of lens unit)

| Lens unit | Initial surface No. | Object distance Infinity | Object distance 3000 | Object distance 500 |
|---|---|---|---|---|
| 1 | 1 | 0.00000 | −0.01486 | −0.10774 |
| 2 | 16 | 4.51489 | 4.49804 | 4.39276 |
| 3 | 18 | 0.21400 | 0.21400 | 0.21400 |

Numerical Example 2

The single focal length lens system of Numerical Example 2 corresponds to Embodiment 2 shown in FIG. 3. Table 8 shows the surface data-1 of the single focal length lens system of Numerical Example 2. Table 9 shows the surface data-2. Table 10 shows the aspherical data. Table 11 shows the various data. Table 12 shows the single lens data. Table 13 shows the lens unit data. Table 14 shows the magnification of lens unit.

TABLE 8

(Surface data-1)

| Surface number | r | d | nd | vd |
|---|---|---|---|---|
| Object surface | ∞ | Variable | | |
| 1 | 77.24110 | 7.86100 | 2.00069 | 25.5 |
| 2 | −454.06400 | 0.40000 | | |
| 3 | 23.50000 | 4.08050 | 1.91082 | 35.2 |
| 4 | 26.08370 | 3.28640 | | |
| 5 | 94.73440 | 0.85000 | 1.71736 | 29.5 |
| 6 | 21.23810 | 7.31810 | | |
| 7 | −39.81540 | 0.85000 | 1.74077 | 27.8 |
| 8 | 30.62730 | 6.39050 | 1.72916 | 54.7 |
| 9 | −44.51940 | 2.41920 | | |
| 10 | −22.73940 | 0.85000 | 1.73800 | 32.3 |
| 11 | −1257.01650 | 5.28010 | 1.91082 | 35.2 |
| 12 | −30.29050 | 0.70000 | | |
| 13(Diaphragm) | ∞ | 1.20000 | | |
| 14* | 34.65150 | 5.03540 | 1.77010 | 49.7 |
| 15 | −258.09340 | Variable | | |
| 16 | 526.41930 | 0.80000 | 1.64769 | 33.8 |
| 17 | 24.44100 | Variable | | |
| 18 | 21.87260 | 2.41740 | 1.49700 | 81.6 |
| 19 | 26.40490 | 2.54860 | | |
| 20* | 32.24480 | 3.28000 | 1.77010 | 49.7 |
| 21 | 334.08030 | 0.69260 | | |
| 22 | 51.69870 | 0.80000 | 1.58144 | 40.9 |
| 23 | 20.04070 | 3.14480 | | |
| 24 | 44.73170 | 5.51820 | 1.91082 | 35.2 |
| 25 | −28.10000 | 0.90000 | 1.72047 | 34.7 |
| 26 | 175.01140 | 14.70850 | | |
| 27 | ∞ | 4.20000 | 1.51680 | 64.2 |
| 28 | ∞ | 1.00000 | | |
| 29 | ∞ | (BF) | | |
| Image surface | ∞ | | | |

TABLE 9

(Surface data-2)

| Surface number | nC | nF | ng | PgF |
|---|---|---|---|---|
| Object surface | | | | |
| 1 | 1.98941 | 2.02872 | 2.05283 | 0.61349 |
| 2 | | | | |
| 3 | 1.90323 | 1.92907 | 1.94412 | 0.58210 |
| 4 | | | | |
| 5 | 1.71032 | 1.73464 | 1.74931 | 0.60338 |
| 6 | | | | |
| 7 | 1.73307 | 1.75976 | 1.77597 | 0.60762 |
| 8 | 1.72510 | 1.73844 | 1.74571 | 0.54521 |
| 9 | | | | |
| 10 | 1.73131 | 1.75418 | 1.76768 | 0.58981 |
| 11 | 1.90323 | 1.92907 | 1.94412 | 0.58210 |
| 12 | | | | |
| 13(Diaphragm) | | | | |
| 14* | 1.76546 | 1.78094 | 1.78951 | 0.55362 |
| 15 | | | | |
| 16 | 1.64210 | 1.66124 | 1.67258 | 0.59229 |
| 17 | | | | |
| 18 | 1.49514 | 1.50123 | 1.50451 | 0.53875 |
| 19 | | | | |
| 20* | 1.76546 | 1.78094 | 1.78951 | 0.55362 |
| 21 | | | | |
| 22 | 1.57723 | 1.59145 | 1.59965 | 0.57667 |
| 23 | | | | |
| 24 | 1.90323 | 1.92907 | 1.94412 | 0.58210 |
| 25 | 1.71437 | 1.73512 | 1.74723 | 0.58336 |
| 26 | | | | |
| 27 | 1.51432 | 1.52237 | 1.52667 | 0.53418 |
| 28 | | | | |
| 29 | | | | |
| Image surface | | | | |

TABLE 10

(Aspherical data)

Surface No. 14

K = −1.21441E+00, A4 = 1.69261E−06, A6 = −2.97759E−10, A8 = −1.18197E−11
A10 = 1.53249E−13, A12 = −8.86678E−16, A14 = 2.69151E−18, A16 = −3.39814E−21

TABLE 10-continued (Aspherical data)

Surface No. 20

K = −7.00895E−01, A4 = 3.73040E−07, A6 = −2.51570E−10,
A8 = −8.48385E−11
A10 = 2.42112E−12, A12 = −2.98471E−14, A14 = 1.53718E−16,
A16 = −2.79807E−19

TABLE 11

(Various data)

| | Object distance | | |
|---|---|---|---|
| | Infinity | 3000 | 500 |
| Focal length | 41.6506 | 41.8375 | 42.3990 |
| F-number | 1.24315 | 1.25856 | 1.35201 |
| Half view angle | 14.7084 | 14.4893 | 13.2614 |
| Image height | 10.8150 | 10.8150 | 10.8150 |
| Overall length of lens system | 95.4000 | 95.3999 | 95.4000 |
| BF | 0.00016 | 0.00021 | 0.00017 |
| d0 | ∞ | 2904.6000 | 404.6000 |
| d15 | 1.7146 | 2.3936 | 6.6492 |
| d17 | 7.1539 | 6.4748 | 2.2193 |
| Entrance pupil position | 44.7958 | 44.7958 | 44.7958 |
| Exit pupil position | −67.5748 | −66.7274 | −60.6403 |
| Front principal points position | 60.7746 | 60.1641 | 55.2841 |
| Back principal points position | 53.7494 | 52.9635 | 48.6950 |

TABLE 12

(Single lens data)

| Lens element | Initial surface number | Focal length |
|---|---|---|
| 1 | 1 | 66.4578 |
| 2 | 3 | 148.6026 |
| 3 | 5 | −38.3463 |
| 4 | 7 | −23.2496 |
| 5 | 8 | 25.8098 |
| 6 | 10 | −31.3891 |
| 7 | 11 | 34.0076 |
| 8 | 14 | 39.9691 |
| 9 | 16 | −39.5978 |
| 10 | 18 | 217.8248 |
| 11 | 20 | 46.1259 |
| 12 | 22 | −56.8143 |
| 13 | 24 | 19.6581 |
| 14 | 25 | −33.5443 |

TABLE 13

(Lens unit data)

| Lens unit | Initial surface No. | Focal length | Overall length of lens unit | Front principal points position | Back principal points position |
|---|---|---|---|---|---|
| 1 | 1 | 43.38446 | 46.52120 | 38.19841 | 36.66683 |
| 2 | 16 | −39.59778 | 0.80000 | 0.50949 | 0.82365 |
| 3 | 18 | 34.33787 | 38.21010 | 5.90241 | 11.77538 |

TABLE 14

(Magnification of lens unit)

| Lens unit | Initial surface No. | Object distance | | |
|---|---|---|---|---|
| | | Infinity | 3000 | 500 |
| 1 | 1 | 0.00000 | −0.01496 | −0.10862 |
| 2 | 16 | 4.77555 | 4.75843 | 4.65093 |
| 3 | 18 | 0.20103 | 0.20103 | 0.20103 |

Numerical Example 3

The single focal length lens system of Numerical Example 3 corresponds to Embodiment 3 shown in FIG. 5. Table 15 shows the surface data-1 of the single focal length lens system of Numerical Example 3. Table 16 shows the surface data-2. Table 17 shows the aspherical data. Table 18 shows the various data. Table 19 shows the single lens data. Table 20 shows the lens unit data. Table 21 shows the magnification of lens unit.

TABLE 15

(Surface data-1)

| Surface number | r | d | nd | vd |
|---|---|---|---|---|
| Object surface | ∞ | Variable | | |
| 1 | 76.96680 | 4.76250 | 2.00100 | 29.1 |
| 2 | −290.73050 | 0.20000 | | |
| 3 | 32.27850 | 4.04780 | 1.88300 | 40.8 |
| 4 | 41.46700 | 2.70050 | | |
| 5 | 894.69020 | 1.00000 | 1.67270 | 32.2 |
| 6 | 24.88580 | 6.36550 | | |
| 7(Diaphragm) | ∞ | 4.87350 | | |
| 8 | −24.32160 | 1.00000 | 1.76182 | 26.6 |
| 9 | 239.09760 | 6.50920 | 1.77250 | 49.6 |
| 10 | −26.83850 | 1.35340 | | |
| 11 | −22.94790 | 1.00000 | 1.75520 | 27.5 |
| 12 | −62.93820 | 4.59630 | 2.00100 | 29.1 |
| 13 | −29.83020 | 0.30000 | | |
| 14* | 40.79560 | 5.32550 | 1.77250 | 49.5 |
| 15 | −446.84950 | Variable | | |
| 16 | 143.56160 | 1.00000 | 1.74950 | 35.0 |
| 17 | 27.30810 | Variable | | |
| 18 | 28.11450 | 2.35410 | 1.77250 | 49.6 |
| 19 | 35.50980 | 3.11430 | | |
| 20* | 29.61930 | 3.98360 | 1.62262 | 58.2 |
| 21 | 495.24750 | 0.80000 | | |
| 22 | 42.40510 | 1.33370 | 1.61293 | 37.0 |
| 23 | 20.54420 | 3.58570 | | |
| 24 | 53.39040 | 4.95310 | 1.91082 | 35.2 |
| 25 | −37.77650 | 1.00840 | 1.68893 | 31.2 |
| 26 | 109.72380 | 15.11910 | | |
| 27 | ∞ | 4.20000 | 1.51680 | 64.2 |
| 28 | ∞ | 1.00000 | | |
| 29 | ∞ | (BF) | | |
| Image surface | ∞ | | | |

TABLE 16

(Surface data-2)

| Surface number | nC | nF | ng | PgF |
|---|---|---|---|---|
| Object surface | | | | |
| 1 | 1.99105 | 2.02540 | 2.04600 | 0.59937 |
| 2 | | | | |
| 3 | 1.87657 | 1.89821 | 1.91044 | 0.56543 |
| 4 | | | | |
| 5 | 1.66661 | 1.68752 | 1.69999 | 0.59618 |
| 6 | | | | |
| 7(Diaphragm) | | | | |

TABLE 16-continued (Surface data-2)

| Surface number | nC | nF | ng | PgF |
|---|---|---|---|---|
| 8 | 1.75359 | 1.78222 | 1.79975 | 0.61218 |
| 9 | 1.76780 | 1.78336 | 1.79193 | 0.55025 |
| 10 | | | | |
| 11 | 1.74729 | 1.77473 | 1.79143 | 0.60898 |
| 12 | 1.99105 | 2.02540 | 2.04600 | 0.59937 |
| 13 | | | | |
| 14* | 1.76781 | 1.78343 | 1.79208 | 0.55383 |
| 15 | | | | |
| 16 | 1.74325 | 1.76464 | 1.77727 | 0.59053 |
| 17 | | | | |
| 18 | 1.76780 | 1.78336 | 1.79193 | 0.55025 |
| 19 | | | | |
| 20* | 1.61935 | 1.63005 | 1.63582 | 0.53900 |
| 21 | | | | |
| 22 | 1.60805 | 1.62463 | 1.63433 | 0.58493 |
| 23 | | | | |
| 24 | 1.90323 | 1.92907 | 1.94412 | 0.58210 |
| 25 | 1.68251 | 1.70462 | 1.71786 | 0.59886 |
| 26 | | | | |
| 27 | 1.51432 | 1.52237 | 1.52667 | 0.53418 |
| 28 | | | | |
| 29 | | | | |
| Image surface | | | | |

TABLE 17

(Aspherical data)

Surface No. 14

K = 0.00000E+00, A4 = −9.65376E−07, A6 = 6.71575E−09,
A8 = −1.33640E−10
A10 = 1.24173E−12, A12 = −6.02517E−15, A14 = 1.46685E−17,
A16 = −1.41585E−20

Surface No. 20

K = 0.00000E+00, A4 = −2.62182E−06, A6 = 1.20313E−09,
A8 = −1.20966E−10
A10 = 1.83438E−12, A12 = −1.45822E−14, A14 = 5.71708E−17,
A16 = −8.81636E−20

TABLE 18

(Various data)

| Object distance | Infinity | 3000 | 500 |
|---|---|---|---|
| Focal length | 41.6503 | 41.7892 | 42.1270 |
| F-number | 1.24206 | 1.24976 | 1.29570 |
| Half view angle | 14.7082 | 14.5995 | 13.9484 |
| Image height | 10.8150 | 10.8150 | 10.8150 |
| Overall length of lens system | 95.9997 | 95.9997 | 95.9998 |
| BF | −0.00008 | −0.00005 | −0.00009 |
| d0 | ∞ | 2904.0000 | 403.9999 |
| d15 | 1.7998 | 2.5219 | 7.0791 |
| d17 | 7.7138 | 6.9917 | 2.4346 |
| Entrance pupil position | 20.3463 | 20.3463 | 20.3463 |
| Exit pupil position | −238.8686 | −219.6199 | −143.2799 |
| Front principal points position | 54.7343 | 54.1621 | 49.7028 |
| Back principal points position | 54.3494 | 53.6118 | 49.5608 |

TABLE 19

(Single lens data)

| Lens element | Initial surface number | Focal length |
|---|---|---|
| 1 | 1 | 61.1915 |
| 2 | 3 | 136.7273 |
| 3 | 5 | −38.0699 |
| 4 | 8 | −28.9305 |
| 5 | 9 | 31.5730 |
| 6 | 11 | −48.3436 |
| 7 | 12 | 52.9715 |
| 8 | 14 | 48.6232 |
| 9 | 16 | −45.1602 |
| 10 | 18 | 153.4624 |
| 11 | 20 | 50.4322 |
| 12 | 22 | −66.5603 |
| 13 | 24 | 24.9350 |
| 14 | 25 | −40.6766 |

TABLE 20

(Lens unit data)

| Lens unit | Initial surface No. | Focal length | Overall length of lens unit | Front principal points position | Back principal points position |
|---|---|---|---|---|---|
| 1 | 1 | 44.65502 | 44.03420 | 37.31080 | 37.30459 |
| 2 | 16 | −45.16016 | 1.00000 | 0.70847 | 1.13476 |
| 3 | 18 | 38.29881 | 40.45200 | 4.55643 | 10.85987 |

TABLE 21

(Magnification of lens unit)

| Lens unit | Initial surface No. | Object distance | | |
|---|---|---|---|---|
| | | Infinity | 3000 | 500 |
| 1 | 1 | 0.00000 | −0.01542 | −0.11258 |
| 2 | 16 | 4.63513 | 4.61915 | 4.51822 |
| 3 | 18 | 0.20123 | 0.20123 | 0.20123 |

Numerical Example 4

The single focal length lens system of Numerical Example 4 corresponds to Embodiment 4 shown in FIG. 7. Table 22 shows the surface data-1 of the single focal length lens system of Numerical Example 4. Table 23 shows the surface data-2. Table 24 shows the aspherical data. Table 25 shows the various data. Table 26 shows the single lens data. Table 27 shows the lens unit data. Table 28 shows the magnification of lens unit.

TABLE 22

(Surface data-1)

| Surface number | r | d | nd | vd |
|---|---|---|---|---|
| Object surface | ∞ | Variable | | |
| 1 | 71.90420 | 4.42610 | 2.00069 | 25.5 |
| 2 | −674.87120 | 0.40000 | | |
| 3 | 21.22720 | 4.30050 | 1.61800 | 63.4 |
| 4 | 25.97790 | 3.28500 | | |
| 5 | 77.87910 | 1.00000 | 1.76182 | 26.6 |
| 6 | 19.51480 | 6.96610 | | |
| 7 (Diaphragm) | ∞ | 4.95400 | | |

TABLE 22-continued (Surface data-1)

| Surface number | r | d | nd | vd |
|---|---|---|---|---|
| 8 | −21.74970 | 1.00000 | 1.74077 | 27.8 |
| 9 | −2150.83650 | 5.06090 | 1.59282 | 68.6 |
| 10 | −32.15270 | 0.20000 | | |
| 11 | −49.43860 | 1.00000 | 1.72825 | 28.3 |
| 12 | 78.73590 | 6.95050 | 1.91082 | 35.2 |
| 13 | −38.23840 | 0.20000 | | |
| 14* | 39.82550 | 5.50220 | 1.77250 | 49.5 |
| 15 | −307.81190 | Variable | | |
| 16 | 1522.98390 | 0.80000 | 1.51823 | 59.0 |
| 17 | 24.44100 | Variable | | |
| 18 | 22.04690 | 2.49880 | 1.49700 | 81.6 |
| 19 | 26.40490 | 3.91370 | | |
| 20* | 29.45910 | 4.06100 | 1.58913 | 61.3 |
| 21 | −1173.86370 | 0.80000 | | |
| 22 | 55.71410 | 1.19370 | 1.65412 | 39.7 |
| 23 | 20.47170 | 3.02520 | | |
| 24 | 42.22330 | 5.88690 | 1.88100 | 40.1 |
| 25 | −27.37590 | 1.00000 | 1.72047 | 34.7 |
| 26 | 165.71190 | 14.89420 | | |
| 27 | ∞ | 4.20000 | 1.51680 | 64.2 |
| 28 | ∞ | 1.00000 | | |
| 29 | ∞ | (BF) | | |
| Image surface | ∞ | | | |

TABLE 23

(Surface data-2)

| Surface number | nC | nF | ng | PgF |
|---|---|---|---|---|
| Object surface | | | | |
| 1 | 1.98941 | 2.02872 | 2.05283 | 0.61349 |
| 2 | | | | |
| 3 | 1.61503 | 1.62478 | 1.63004 | 0.54002 |
| 4 | | | | |
| 5 | 1.75359 | 1.78222 | 1.79975 | 0.61218 |
| 6 | | | | |
| 7 (Diaphragm) | | | | |
| 8 | 1.73307 | 1.75976 | 1.77597 | 0.60762 |
| 9 | 1.59021 | 1.59884 | 1.60354 | 0.54401 |
| 10 | | | | |
| 11 | 1.72082 | 1.74654 | 1.76211 | 0.60575 |
| 12 | 1.90323 | 1.92907 | 1.94412 | 0.58210 |
| 13 | | | | |
| 14* | 1.76781 | 1.78343 | 1.79208 | 0.55383 |
| 15 | | | | |
| 16 | 1.51556 | 1.52435 | 1.52913 | 0.54407 |
| 17 | | | | |
| 18 | 1.49514 | 1.50123 | 1.50451 | 0.53875 |
| 19 | | | | |
| 20* | 1.58618 | 1.59580 | 1.60097 | 0.53729 |
| 21 | | | | |
| 22 | 1.64923 | 1.66571 | 1.67516 | 0.57364 |
| 23 | | | | |
| 24 | 1.87450 | 1.89645 | 1.90896 | 0.56997 |
| 25 | 1.71437 | 1.73512 | 1.74723 | 0.58336 |
| 26 | | | | |
| 27 | 1.51432 | 1.52237 | 1.52667 | 0.53418 |
| 28 | | | | |
| 29 | | | | |
| Image surface | | | | |

TABLE 24

(Aspherical data)

Surface No. 14

K = 0.00000E+00, A4 = −9.05394E−07, A6 = −5.35979E−09,
A8 = 2.80118E−11 A10 = −1.50063E−14, A12 = −1.18866E−15,

TABLE 24-continued (Aspherical data)

A14 = 1.02279E−17, A16 = −4.14772E−20 A18 = 8.42737E−23,
A20 = −6.79062E−26

Surface No. 20

K = 0.00000E+00, A4 = −5.09864E−06, A6 = 1.17106E−07,
A8 = −3.23255E−09 A10 = 4.57528E−11, A12 = −3.41477E−13,
A14 = 9.69667E−16, A16 = 3.21495E−18 A18 = −2.94143E−20,
A20 = 5.80037E−23

TABLE 25

(Various data)

| Object distance | Infinity | 3000 | 500 |
|---|---|---|---|
| Focal length | 41.6496 | 41.7858 | 42.1430 |
| F-number | 1.24560 | 1.25185 | 1.28804 |
| Half view angle | 14.6346 | 14.5431 | 14.0024 |
| Image height | 10.8150 | 10.8150 | 10.8150 |
| Overall length of lens system | 97.5001 | 97.5001 | 97.5001 |
| BF | 0.00010 | 0.00018 | 0.00015 |
| d0 | ∞ | 2902.5000 | 402.5000 |
| d15 | 1.8000 | 2.5260 | 7.0761 |
| d17 | 7.1812 | 6.4551 | 1.9051 |
| Entrance pupil position | 24.3729 | 24.3729 | 24.3729 |
| Exit pupil position | −355.7955 | −317.3435 | −185.2870 |
| Front principal points position | 61.1470 | 60.6462 | 56.7051 |
| Back principal points position | 55.8505 | 55.1166 | 51.0987 |

TABLE 26

(Single lens data)

| Lens element | Initial surface number | Focal length |
|---|---|---|
| 1 | 1 | 65.1288 |
| 2 | 3 | 139.5679 |
| 3 | 5 | −34.4362 |
| 4 | 8 | −29.6668 |
| 5 | 9 | 55.0107 |
| 6 | 11 | −41.5653 |
| 7 | 12 | 29.0821 |
| 8 | 14 | 45.9649 |
| 9 | 16 | −47.9404 |
| 10 | 18 | 225.7939 |
| 11 | 20 | 48.8413 |
| 12 | 22 | −50.1478 |
| 13 | 24 | 19.6288 |
| 14 | 25 | −32.5396 |

TABLE 27

(Lens unit data)

| Lens unit | Initial surface No. | Focal length | Overall length of lens unit | Front principal points position | Back principal points position |
|---|---|---|---|---|---|
| 1 | 1 | 44.17039 | 45.24530 | 41.58426 | 38.38881 |
| 2 | 16 | −47.94041 | 0.80000 | 0.53562 | 0.80860 |
| 3 | 18 | 39.42078 | 41.47350 | 6.99348 | 13.10313 |

TABLE 28

(Magnification of lens unit)

| Lens unit | Initial surface No. | Object distance | | |
|---|---|---|---|---|
| | | Infinity | 3000 | 500 |
| 1 | 1 | 0.00000 | −0.01523 | −0.11045 |
| 2 | 16 | 3.69850 | 3.68338 | 3.58846 |
| 3 | 18 | 0.25495 | 0.25495 | 0.25495 |

Numerical Example 5

The single focal length lens system of Numerical Example 5 corresponds to Embodiment 5 shown in FIG. 9. Table 29 shows the surface data-1 of the single focal length lens system of Numerical Example 5. Table 30 shows the surface data-2. Table 31 shows the aspherical data. Table 32 shows the various data. Table 33 shows the single lens data. Table 34 shows the lens unit data. Table 35 shows the magnification of lens unit.

TABLE 29

(Surface data-1)

| Surface number | r | d | nd | vd |
|---|---|---|---|---|
| Object surface | ∞ | Variable | | |
| 1 | 77.55080 | 5.70780 | 2.00069 | 25.5 |
| 2 | −407.46950 | 0.40000 | | |
| 3 | 23.74930 | 4.08930 | 1.91082 | 35.2 |
| 4 | 26.61730 | 3.19430 | | |
| 5 | 104.03160 | 0.85000 | 1.71736 | 29.5 |
| 6 | 21.73060 | 6.87150 | | |
| 7 | −41.75090 | 0.85000 | 1.74077 | 27.8 |
| 8 | 32.11610 | 6.08100 | 1.72916 | 54.7 |
| 9 | −44.92420 | 2.12670 | | |
| 10 | −23.77070 | 1.13320 | 1.73800 | 32.3 |
| 11 | 555.78350 | 5.73370 | 1.91082 | 35.2 |
| 12 | −32.90390 | 0.70000 | | |
| 13 (Diaphragm) | ∞ | 1.20000 | | |
| 14* | 35.52720 | 4.85700 | 1.77010 | 49.7 |
| 15 | −251.64660 | Variable | | |
| 16 | 357.60090 | 0.80000 | 1.64769 | 33.8 |
| 17 | 24.44100 | Variable | | |
| 18 | 21.87670 | 2.38880 | 1.49700 | 81.6 |
| 19 | 26.40490 | 2.47480 | | |
| 20* | 31.66080 | 3.28000 | 1.77010 | 49.7 |
| 21 | 350.88780 | 0.67810 | | |
| 22 | 41.36620 | 1.01760 | 1.58144 | 40.9 |
| 23 | 19.23350 | 3.29140 | | |
| 24 | 48.25900 | 4.98310 | 1.91082 | 35.2 |
| 25 | −29.56530 | 0.90000 | 1.72047 | 34.7 |
| 26 | 125.00040 | 14.82220 | | |
| 27 | ∞ | 4.20000 | 1.51680 | 64.2 |
| 28 | ∞ | 1.00000 | | |
| 29 | ∞ | (BF) | | |
| Image surface | ∞ | | | |

TABLE 30

(Surface data-2)

| Surface number | nC | nF | ng | PgF |
|---|---|---|---|---|
| Object surface | | | | |
| 1 | 1.98941 | 2.02872 | 2.05283 | 0.61349 |
| 2 | | | | |
| 3 | 1.90323 | 1.92907 | 1.94412 | 0.58210 |
| 4 | | | | |
| 5 | 1.71032 | 1.73464 | 1.74931 | 0.60338 |
| 6 | | | | |
| 7 | 1.73307 | 1.75976 | 1.77597 | 0.60762 |
| 8 | 1.72510 | 1.73844 | 1.74571 | 0.54521 |
| 9 | | | | |
| 10 | 1.73131 | 1.75418 | 1.76768 | 0.58981 |
| 11 | 1.90323 | 1.92907 | 1.94412 | 0.58210 |
| 12 | | | | |
| 13 (Diaphragm) | | | | |
| 14* | 1.76546 | 1.78094 | 1.78951 | 0.55362 |
| 15 | | | | |
| 16 | 1.64210 | 1.66124 | 1.67258 | 0.59229 |
| 17 | | | | |
| 18 | 1.49514 | 1.50123 | 1.50451 | 0.53875 |
| 19 | | | | |
| 20* | 1.76546 | 1.78094 | 1.78951 | 0.55362 |
| 21 | | | | |
| 22 | 1.57723 | 1.59145 | 1.59965 | 0.57667 |
| 23 | | | | |
| 24 | 1.90323 | 1.92907 | 1.94412 | 0.58210 |
| 25 | 1.71437 | 1.73512 | 1.74723 | 0.58336 |
| 26 | | | | |
| 27 | 1.51432 | 1.52237 | 1.52667 | 0.53418 |
| 28 | | | | |
| 29 | | | | |
| Image surface | | | | |

TABLE 31

(Aspherical data)

Surface No. 14

K = −6.32271E−01, A4 = −1.42435E−07, A6 = 4.80045E−10, A8 = −4.47091E−11 A10 = 6.57429E−13, A12 = −4.36493E−15, A14 = 1.40294E−17, A16 = −1.77567E−20

Surface No. 20

K = −1.19401E+00, A4 = 2.50312E−06, A6 = −6.28166E−09, A8 = 2.11966E−10 A10 = −3.72303E−12, A12 = 2.97405E−14, A14 = −1.15161E−16, A16 = 1.74070E−19

TABLE 32

(Various data)

| Object distance | Infinity | 3000 | 500 |
|---|---|---|---|
| Focal length | 41.6508 | 41.8044 | 42.1822 |
| F-number | 1.28400 | 1.29968 | 1.39472 |
| Half view angle | 14.7073 | 14.4893 | 13.2684 |
| Image height | 10.8150 | 10.8150 | 10.8150 |
| Overall length of lens system | 92.4997 | 92.4997 | 92.4997 |
| BF | −0.00016 | −0.00018 | −0.00019 |
| d0 | ∞ | 2907.5000 | 407.5000 |
| d15 | 1.6489 | 2.3293 | 6.5938 |
| d17 | 7.2205 | 6.5401 | 2.2756 |
| Entrance pupil position | 41.2669 | 41.2669 | 41.2669 |
| Exit pupil position | −63.0615 | −62.3743 | −57.3321 |
| Front principal points position | 55.4082 | 54.7818 | 49.9063 |
| Back principal points position | 50.8490 | 50.0969 | 46.0323 |

TABLE 33

(Single lens data)

| Lens element | Initial surface number | Focal length |
|---|---|---|
| 1 | 1 | 65.4914 |
| 2 | 3 | 144.0734 |
| 3 | 5 | −38.4567 |
| 4 | 7 | −24.3856 |
| 5 | 8 | 26.5683 |
| 6 | 10 | −30.8629 |
| 7 | 11 | 34.2654 |
| 8 | 14 | 40.7256 |
| 9 | 16 | −40.5422 |
| 10 | 18 | 218.4222 |
| 11 | 20 | 44.9890 |
| 12 | 22 | −62.8881 |
| 13 | 24 | 20.7622 |
| 14 | 25 | −33.1061 |

TABLE 34

(Lens unit data)

| Lens unit | Initial surface No. | Focal length | Overall length of lens unit | Front principal points position | Back principal points position |
|---|---|---|---|---|---|
| 1 | 1 | 43.39643 | 43.79450 | 35.26267 | 34.49508 |
| 2 | 16 | −40.54224 | 0.80000 | 0.52164 | 0.83565 |
| 3 | 18 | 35.36912 | 38.03600 | 5.00902 | 10.88078 |

TABLE 35

(Magnification of lens unit)

| Lens unit | Initial surface No. | Object distance | | |
|---|---|---|---|---|
| | | Infinity | 3000 | 500 |
| 1 | 1 | 0.00000 | −0.01497 | −0.10866 |
| 2 | 16 | 4.70558 | 4.68879 | 4.58359 |
| 3 | 18 | 0.20396 | 0.20397 | 0.20397 |

The following Table 36 shows the corresponding values to the individual conditions in the single focal length lens systems of each of Numerical Examples.

TABLE 36

(Values corresponding to conditions)

| Condition | Numerical Example | | | | |
|---|---|---|---|---|---|
| | 1 | 2 | 3 | 4 | 5 |
| (1) $|f_W/f_A|$ | 1.79(L4) | 1.79(L4) | 1.44(L4) | 1.40(L4) | 1.71(L4) |
| (2) $f_W/f_B$ | 1.56(L5) | 1.61(L5) | 1.32(L5) | 0.76(L5) | 1.57(L5) |
| (3) $|f_W/f_C|$ | 1.14(L6) | 1.33(L6) | 0.86(L6) | 1.00(L6) | 1.35(L6) |
| (4) $f_W/f_D$ | 1.07(L7) | 1.22(L7) | 0.79(L7) | 1.43(L7) | 1.22(L7) |
| (5) $(R1_G + R2_G)/(R1_G − R2_G)$ | 1.838(L3) | 1.578(L3) | 1.057(L3) | 1.669(L3) | 1.528(L3) |
| (6) $|f_W/f_H|$ | 1.04(L9) | 1.05(L9) | 0.92(L9) | 0.87(L9) | 1.03(L9) |
| (7) $0.0018 \times vd_I + PgF_I$ | 0.6458(L14) | 0.6458(L14) | 0.6515(L12) | 0.6451(L12) | 0.6458(L14) | note 1:
A symbol of a lens element concerned is shown in parentheses following each value.

note 2:
As to the condition (7), a minimum value among values of lens elements concerned is shown.

The present disclosure is applicable to, for example, a digital still camera, a digital video camera, a camera for a mobile terminal device such as a smart-phone, a camera for a PDA (Personal Digital Assistance), a surveillance camera in a surveillance system, a Web camera, a vehicle-mounted camera or the like. In particular, the present disclosure is applicable to a photographing optical system where high image quality is required like in a digital still camera system or a digital video camera system.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. A single focal length lens system, in order from an object side to an image side, comprising: at least
a first lens unit having positive optical power; and
a second lens unit having optical power, wherein
the first lens unit includes a first sub lens unit E which, successively in order from the object side to the image side, comprises:
a lens element A having negative optical power;
a lens element B having positive optical power;
a lens element C having negative optical power; and
a lens element D having positive optical power, wherein
in the second lens unit, a second sub lens unit comprising at least one lens element is a focusing lens unit that moves with respect to an image surface along an optical axis in focusing from an infinity in-focus condition to a close-object in-focus condition, and wherein the following conditions (1) to (4) are satisfied:

$$1.0 < |f_W/f_A| < 2.2 \tag{1}$$

$$0.5 < f_W/f_B < 2.0 \tag{2}$$

$$0.5 < |f_W/f_C| < 1.7 \tag{3}$$

$$0.5 < f_W/f_D < 1.8 \tag{4}$$

where $f_W$ is a focal length of the single focal length lens system in the infinity in-focus condition, $f_A$ is a focal length of the lens element A, $f_B$ is a focal length of the lens element B, $f_C$ is a focal length of the lens element C, and $f_D$ is a focal length of the lens element D.

2. The single focal length lens system as claimed in claim 1, wherein the lens element A and the lens element B are cemented with each other at one optical surface thereof, thereby to form a cemented lens element.

3. The single focal length lens system as claimed in claim 1, wherein the lens element C and the lens element D are cemented with each other at one optical surface thereof, thereby to form a cemented lens element.

4. The single focal length lens system as claimed in claim 1, wherein the first lens unit, on the object side relative to the first sub lens unit E, includes:
a lens element F having positive optical power; and
a lens element G having negative optical power, and wherein the following condition (5) is satisfied:

$$0.7 < (R1_G + R2_G)/(R1_G - R2_G) < 2.2 \tag{5}$$

where $R1_G$ is a radius of curvature of an object side surface of the lens element G, and $R2_G$ is a radius of curvature of an image side surface of the lens element G.

5. The single focal length lens system as claimed in claim 1, wherein the focusing lens unit comprises a single lens element H having negative optical power, and wherein the following condition (6) is satisfied:

$$0.8 < |f_W/f_H| < 1.2 \tag{6}$$

where $f_W$ is a focal length of the single focal length lens system in the infinity in-focus condition, and $f_H$ is a focal length of the lens element H.

6. The single focal length lens system as claimed in claim 1, comprising:

an aperture diaphragm; and lens elements placed on the image side relative to the aperture diaphragm, and having negative optical power, wherein a lens element I which is at least one of the lens elements satisfies the following condition (7):

$$0.638 < 0.0018 \times vd_I + PgF_I < 0.652 \tag{7}$$

where $vd_I$ is an Abbe number to a d-line of the lens element I, and $PgF_I$ is a partial dispersion ratio of the lens element I, which is the ratio of a difference between a refractive index to a g-line and a refractive index to a F-line, to a difference between the refractive index to the F-line and a refractive index to a C-line.

7. An interchangeable lens apparatus comprising:

the single focal length lens system as claimed in claim 1; and a lens mount section which is connectable to a camera body including an image sensor for receiving an optical image formed by the single focal length lens system and converting the optical image into an electric image signal.

8. A camera system comprising:

an interchangeable lens apparatus including the single focal length lens system as claimed in claim 1; and a camera body which is detachably connected to the interchangeable lens apparatus via a camera mount section, and includes an image sensor for receiving an optical image formed by the single focal length lens system and converting the optical image into an electric image signal.

* * * * *